(12) United States Patent  (10) Patent No.: US 8,677,913 B2
Kastingschafer et al.  (45) Date of Patent: Mar. 25, 2014

(54) METHOD AND DEVICE FOR INCINERATING COMBUSTION MATERIAL

(75) Inventors: Gerhard Kastingschafer, Wadersloh (DE); Frank Ruoss, Dorsten (DE)

(73) Assignee: Polysius AG (DE)

( * ) Notice: Subject to any disclaimer, the term of this patent is extended or adjusted under 35 U.S.C. 154(b) by 1970 days.

(21) Appl. No.: 11/574,834

(22) PCT Filed: Aug. 11, 2005

(86) PCT No.: PCT/EP2005/008764
§ 371 (c)(1),
(2), (4) Date: Mar. 7, 2007

(87) PCT Pub. No.: WO2006/029679
PCT Pub. Date: Mar. 23, 2006

(65) Prior Publication Data
US 2007/0261618 A1  Nov. 15, 2007

(30) Foreign Application Priority Data

Sep. 14, 2004 (DE) .......................... 10 2004 044 447
Sep. 20, 2004 (DE) .......................... 10 2004 045 510

(51) Int. Cl.
*F23G 5/00* (2006.01)
*F23G 7/00* (2006.01)
*C04B 7/44* (2006.01)

(52) U.S. Cl.
USPC ............................ 110/258; 110/346; 106/745

(58) Field of Classification Search
USPC ........... 431/121; 106/739, 745, 744; 209/132, 209/133, 134, 135, 138, 139; 241/18, 19, 241/24.1; 110/244, 255, 235, 247, 346, 258
See application file for complete search history.

(56) References Cited

U.S. PATENT DOCUMENTS

| 5,098,285 | A | * | 3/1992 | Bauer | 432/14 |
| 5,566,625 | A | * | 10/1996 | Young | 110/244 |
| 5,787,822 | A | * | 8/1998 | Hilliard | 110/229 |
| 5,865,130 | A | * | 2/1999 | Jamison et al. | 110/212 |
| 6,321,665 | B1 | | 11/2001 | Uchida | |
| 2005/0066865 | A1 | * | 3/2005 | Van Kessel | 110/346 |

FOREIGN PATENT DOCUMENTS

DE  3839381  1/1990

* cited by examiner

*Primary Examiner* — Kenneth Rinehart
*Assistant Examiner* — David J Laux
(74) *Attorney, Agent, or Firm* — Gifford, Krass, Sprinkle, Anderson & Citkowski, P.C.

(57) ABSTRACT

A method and apparatus for incinerating combustion material in the form of combustible waste during cement production is provided. The method includes introducing combustion material in the form of combustible waste into a combustion chamber and burning the combustion material within a first air flow. In addition, a second air flow in a region of a floor of the combustion chamber is included in such a manner that residues or remaining combustion materials which are located on the floor are moved by the second air flow back into the first air flow. Cement raw meal can also be fed into the combustion chamber.

14 Claims, 3 Drawing Sheets

METHOD AND DEVICE FOR INCINERATING COMBUSTION MATERIAL

Figure 1:
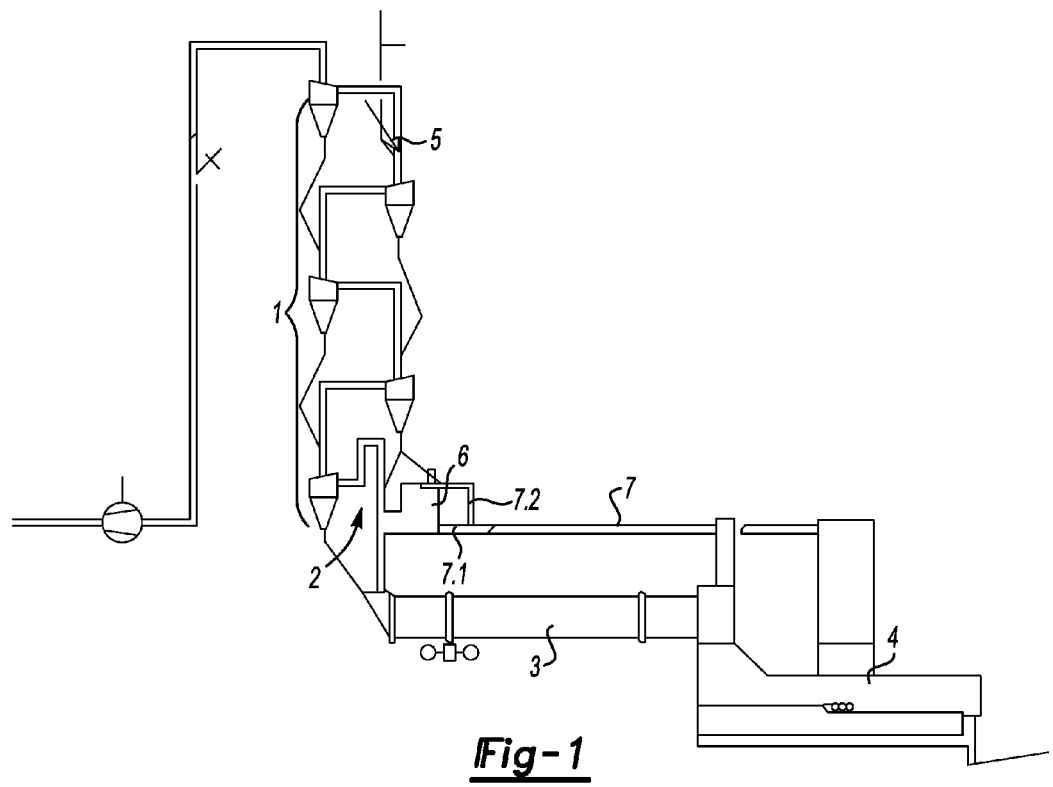

The invention relates to a method and a device for incinerating combustion material in the form of waste which is combustible and which is, in particular, in the form of pieces, during cement production, the combustion material being introduced into a combustion chamber and being burned with the addition of at least a first air flow.

Separate combustion chambers for combustible waste materials, together with calcinators, are known in cement works. Combustion chambers of this type have movable components for transporting the combustion materials during the incineration operation and for discharging the combustion residues.

In another form of combustion chamber, the combustion residues are discharged together with the gas flow into the calcinator via a discharge chute. However, these combustion chambers are largely unsuitable for combustible waste materials in the form of pieces since the partially unburned pieces of combustion material may remain on the discharge chute and then lead to blockages.

In EP-0 582 394, the floor of the combustion chamber forms a type of fluid bed, the residues being discharged upwards together with the gas flow. The problem with this type of combustion chamber lies in the fact that the residues which are not dispersible remain on the floor and impair the operation of the combustion chamber.

The object of the invention is therefore to set out a method and a device for incinerating combustion material, reliable operation being ensured even with problematic combustion materials in the form of pieces.

According to the invention, this object is achieved by the features of claims 1, 12 and 14.

The subordinate claims relate to further configurations of the invention.

In the method according to the invention for incinerating combustion material in the form of combustible waste, in particular in the form of pieces, during cement production, the combustion material is introduced into a combustion chamber and burned with the addition of at least a first air flow. In the region of the floor of the combustion chamber, at least a second air flow is supplied so that the residues or remaining combustion materials which are located on the floor are moved by the second air flow and come into operational contact with the at least one first air flow.

According to the preferred embodiment, the second air flow is supplied in the form of compressed air pulses. A portion of the combustion material (that is to say, the dispersible components) are taken up and burned by the first air flow after being fed into the combustion chamber. The combustion materials which are not dispersible are the combustion materials which fall onto the floor of the combustion chamber in an unburned or partially burned state. These residues or remaining combustion materials are lifted again there by the second air flow and further burned by being introduced into the first air flow until they are discharged therewith from the combustion chamber. The components which are not combustible or which are too heavy to be pneumatically discharged by the first air flow can be transported to the outlet of the combustion chamber using the second air flow which is supplied in the form of compressed air pulses.

The device according to the invention for incinerating combustion material in the form of combustible waste during cement production has a combustion chamber which has a static floor, means for feeding the combustion material and means for supplying at least a first air flow. In the region of the floor, means are further provided for supplying at least a second air flow in the form of compressed air pulses.

According to a preferred configuration, this device for incinerating combustion material is integrated in an installation for cement production, comprising a preheater, a precalcinator and a rotary tubular furnace.

Figure 2:
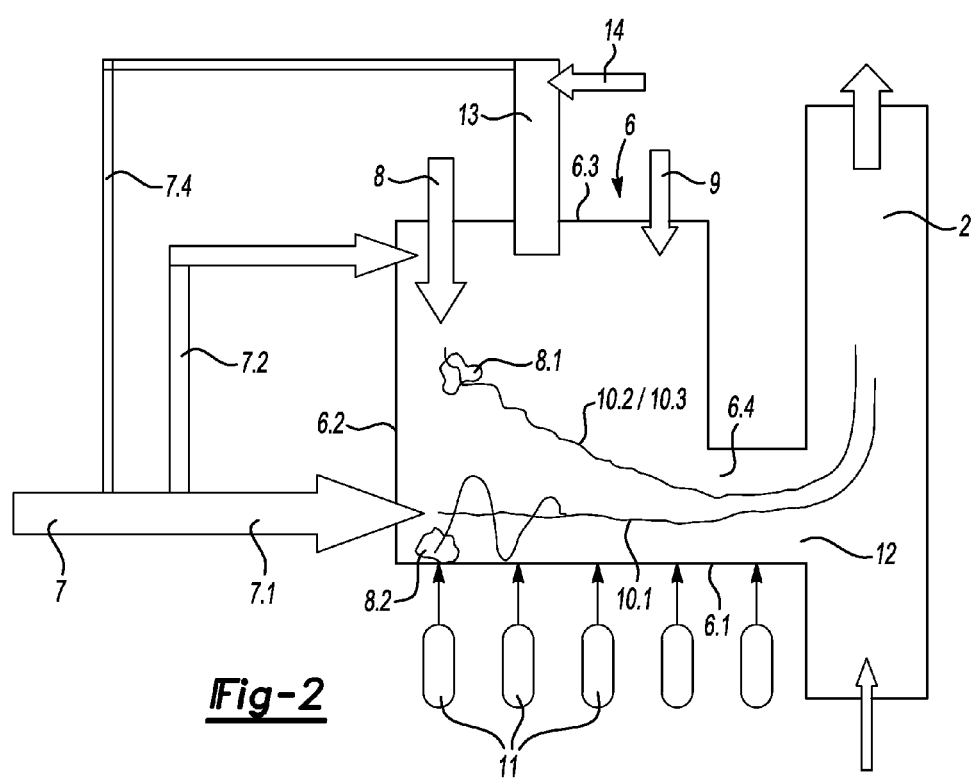
Figure 3:
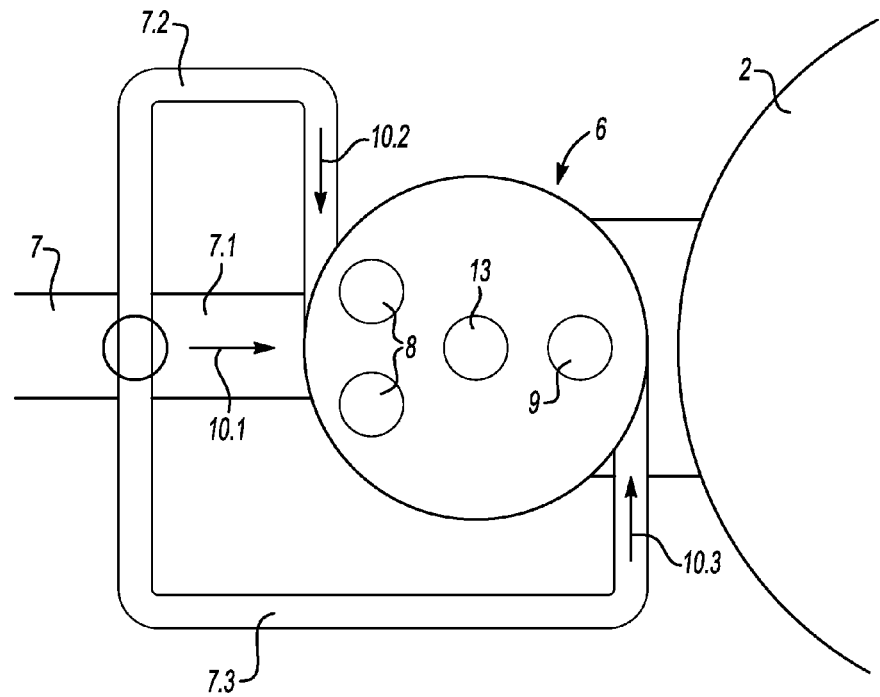
Figure 4:
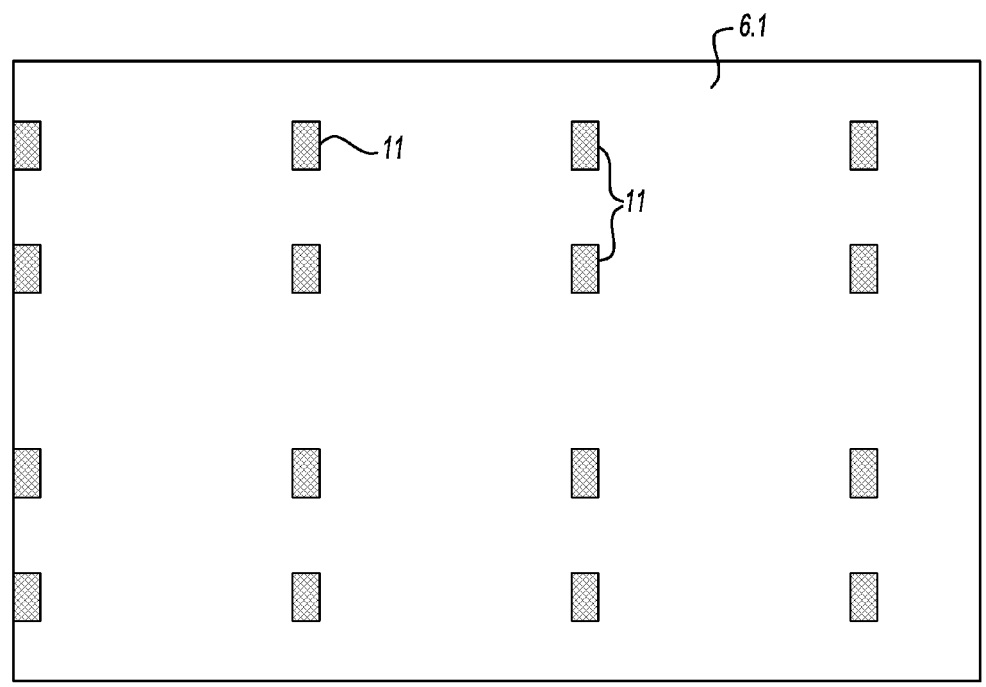
Figure 5:
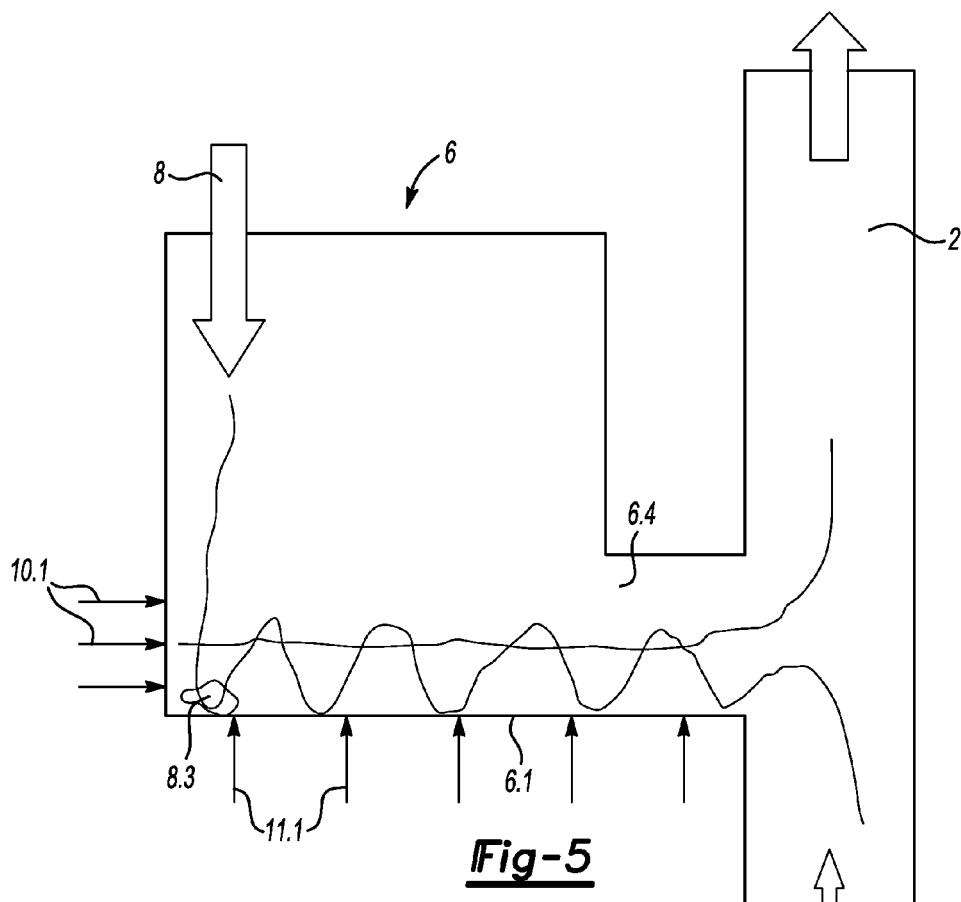
Figure 6:
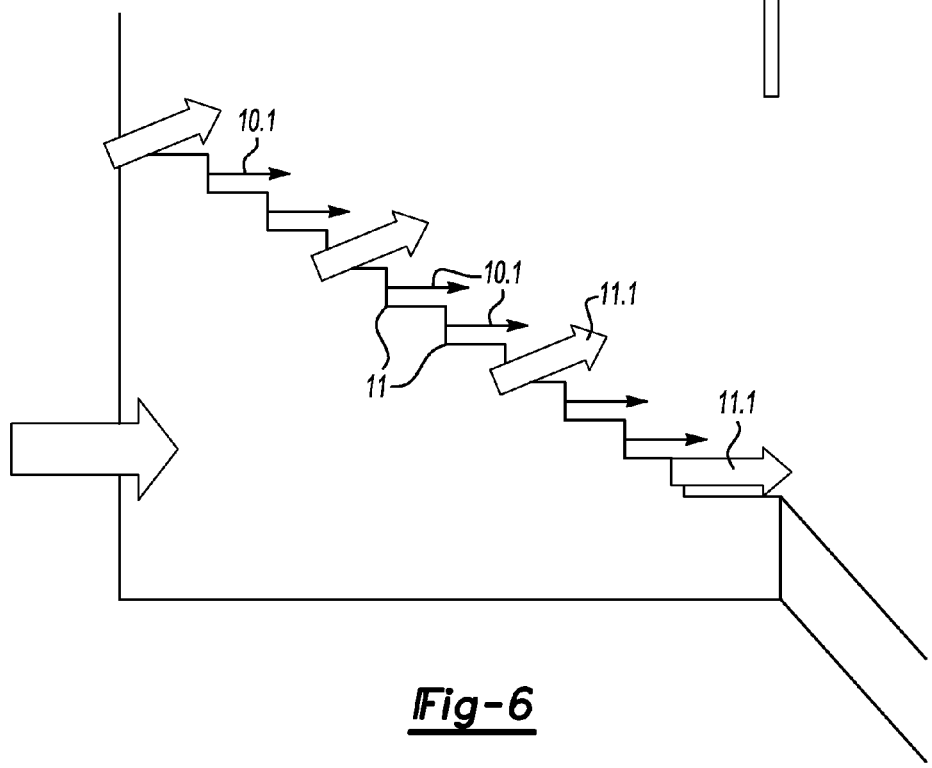

Further configurations and advantages of the invention are explained in greater detail with reference to the description of a number of embodiments and the drawings, in which:

FIG. 1 is a schematic view of an installation for cement production,

FIG. 2 is a schematic side view of the combustion chamber to illustrate a first operating situation, FIG. 3 is a schematic plan view of the device according to FIG. 2, FIG. 4 is a schematic plan view of the floor of the combustion chamber, FIG. 5 is a schematic side view of the combustion chamber to illustrate a second operating situation, and FIG. 6 is a schematic side view in the region of the floor of the combustion chamber according to a second variant.

The installation for cement production illustrated in FIG. 1 substantially comprises a preheater 1, a calcinator 2, a rotary tubular furnace 3 and a cooler 4.

The cement raw meal is supplied to the preheater 1 at a feed location 5, is then preheated in the individual stages of the preheater, subsequently reaches the calcinator 2 for precalcination and is then burned in the rotary tubular furnace to form cement clinker which is then cooled in the cooler 4.

The calcinator 2 comprises a separate combustion chamber 6 for incinerating combustion material in the form of combustible waste. For the combustion of the combustion material, it is possible to use fresh air, exhaust air, or preferably tertiary air from the cooler which is supplied, in the present case, via a tertiary air line 7.

The combustion chamber 6 which is illustrated in greater detail in FIG. 2 has a floor 6.1, side walls 6.2 and a ceiling 6.3. In the region of the floor 6.1, the combustion chamber 6 is connected to the calcinator 2 by means of an outlet 6.4 and a connection line 12.

The combustion chamber 6 is further provided with means 8 for feeding combustion material and means 9 for feeding raw meal. Furthermore, a first air flow is supplied via the tertiary air line 7 and branches, in the embodiment illustrated, into three line portions 7.1-7.3. In this manner, a first part flow 10.1 is supplied in the lower region of the combustion chamber 6 via the line portion 7.1. The second and third part flows are introduced in the upper region of the combustion chamber via the line portions 7.2 and 7.3.

Although the raw meal is fed via the ceiling 6.3 in the embodiment illustrated, it would also be conceivable in the context of the invention for the raw meal to be introduced into the combustion chamber, for example, together with the second and third part flow 10.2, 10.3.

The two line portions 7.2 and 7.3 are connected to the cylindrical combustion chamber 6 in a substantially tangential manner. The line portion 7.1 opens in the combustion chamber 6 in such a manner that the first part flow 10.1 is directed substantially parallel with the floor 6.1 in the direction of the outlet 6.4.

In the region of the floor 6.1 of the combustion chamber, means 11 are provided for supplying the second air flow in the form of compressed air pulses 11.1. In accordance with the plan view in FIG. 4, relating to the illustrated embodiment 16, supply locations are arranged in a state distributed over the floor 6.1.

In the ceiling of the combustion chamber, a burner 13 for burning powdered, fluid and/or gaseous combustion materials 14, such as gas, oil and/or coal may be provided (see FIG. 2). For the ignition, flame formation and at least partial combustion (it is also possible to dispense with this, depending on the combustion materials), the air required can be supplied via a line portion 7.4. The complete combustion of the combustion materials supplied via the burner is carried out by the other air and gas flows (furnace exhaust gas) in the combustion chamber and the calcinator.

The burner 13 can be used in particular for the following reasons:

1. The combustion chamber is operated with the burner 13 only when powdered and fluid combustion materials and gas are used exclusively as combustion material. It is insignificant whether these are regular combustion materials or low-grade or primary and secondary combustion materials.

2. The burner 13 is operated in order to bring the combustion chamber to the operating temperature for feeding combustible waste, for example, when approaching the furnace line, if the temperature of the tertiary air (temperature of the combustion chamber) when the combustible waste materials begin to be fed is not sufficient for the ignition and combustion of the combustible waste materials which are currently being used.

3. The burner 13 is operated in parallel if the thermal energy input into the calcinator is not sufficient from the combustible waste materials alone, or in order to maintain the combustion process (support firing for waste which is difficult to burn) or in order to use powdered and fluid combustible waste materials and low-grade gas at the same time with the piece-like combustion materials.

With reference to FIG. 2, the operating method of the combustion chamber is explained in greater detail below:

The tertiary air originating from the cooler is divided into three part flows 10.1, 10.2 and 10.3 and supplied to the combustion chamber. Owing to the two part flows 10.2 and 10.3 which are introduced from above, the combustion material which is fed in the region of the ceiling is thermally sorted into dispersible combustion materials 8.1 and non-dispersible combustion materials 8.2. The combustion materials referred to as dispersible are those which are burned when falling or which are pneumatically transported into the calcinator 2 with the air flow. Combustion materials referred to as non-dispersible are those which fall onto the static floor 6.1 of the combustion chamber 6 in an unburned or only partially burned state. The first part flow 10.1 which is introduced substantially parallel with the floor 6.1 serves to burn the non-dispersible combustion materials 8.2. The repeated introduction of the combustion material 8.2 in the region of the floor 6.1 using the compressed air pulses enables this combustion material 8.2 to be burned and enables ash and non-combustible residues to be discharged into the calcinator 2. The selective activation of the compressed air pulses lifts the combustion material 8.2 and blows it into or through the part flow 10.1. Further burning of these combustion materials thereby takes place, the combustion material landing on the floor a number of times and being lifted again by the compressed air pulses until it is burned to such an extent that it is also discharged into the calcinator 2 with one of the part air flows 10.1-10.3.

FIG. 5 illustrates an operating situation in which the non-dispersible combustion material 8.3 which cannot be burned comes to rest on the floor 6.1 and is continuously lifted and conveyed in the direction of the outlet 6.4 by the compressed air pulses. The combustion chamber illustrated is also operated only with the first part flow 10.1.

Owing to the optional addition of raw meal, the temperature in the combustion chamber 6 can be limited and the components of the combustion chamber 6 can consequently be protected against overheating. The temperature drop is brought about by the part calcination of the raw meal which is introduced.

The compressed air pulses are directed parallel with the first air flow or preferably in such a manner that they cross the first air flow. Whilst the first air flow (part flows 10.1-10.3) is continuously supplied, the compressed air pulses of the second air flow are carried out in adjustable time intervals, the plurality of the supply locations 11 being able to be activated at the same time or in groups. Owing to the manner of the introduction of the non-dispersible combustion materials 8.2 (pulse of compressed air, frequency of the compressed air pulses, switching of the supply locations), the intensity (speed of the combustion and consequently the dwell time of the combustion material in the combustion chamber) is determined. By the speed of the first air flow, the frequency of the activation of the second air flow and the pulse strength of the compressed air pulses being able to be adjusted, the combustion operation can be adapted in a selective manner to the respective combustion material.

The static floor 6.1 may be horizontal or inclined; it may also be flat or stepped, as illustrated in FIG. 6. With the stepped configuration of the floor according to FIG. 6, the first part flow 10.1 is supplied at a plurality of locations and, in this configuration, a plurality of supply locations 11 for the compressed air pulses 11.1 are supplied in a state distributed over the floor.

With the combustion chamber described above, it is possible to dispense with mechanical conveying elements completely.

However, owing to the provision of compressed air pulses, it is still nonetheless possible to remove unburned residues from the combustion chamber in a reliable manner.

The invention claimed is:

1. A device for incinerating combustion material in the form of combustible waste during cement production, said device comprising:
    a combustion chamber separate from a calcinator, said combustion chamber having a static floor;
    means for feeding the combustion material into the combustion chamber;
    means for supplying at least a first air flow into the combustion chamber;
    means for feeding cement raw meal into the combustion chamber; and
    means for supplying at least a second air flow in the form of compressed air pulses into a region of a floor of said combustion chamber.

2. The device according to claim 1, characterized in that the means for supplying the second air flow has a plurality of supply locations which are distributed over the floor.

3. Installation for cement production having a prewarmer, said calcinator and a rotary tubular furnace, said calcinator having a device according to claim 1 attached thereto.

4. A method for incinerating combustion material in the form of combustible waste during cement production, the method comprising:
    introducing the combustion material in the form of combustible waste into a combustion chamber;
    burning the combustion material with the addition of at least a first air flow;
    supplying at least a second air flow in a region of a floor of the combustion chamber in such a manner that the residues or remaining combustion materials which are located on the floor are moved by the second air flow; and feeding cement raw meal into the combustion chamber;

wherein the combustion material which is located on the floor is lifted by selective activation of the second air flow and is blown into or through the first air flow and thereby comes into operational contact with the first air flow for the purposes of combustion.

5. The method according to claim 4, characterized in that a speed of the first air flow or a frequency of an activation of the second air flow is adjusted.

6. The method according to claim 4, characterized in that the second air flow is supplied in the form of compressed air pulses.

7. The method according to claim 4, characterized in that at least a first part flow of the first air flow is directed substantially parallel with the floor.

8. The method according to claim 4, characterized in that the first air flow functions continuously and the second air flow functions intermittently.

9. The method according to claim 4, characterized in that the second air flow is activated in adjustable time intervals.

10. The method according to claim 4, characterized in that the floor has a plurality of supply locations for the second air flow, the supply locations being activated simultaneously or in groups.

11. The method according to claim 4, characterized in that a speed of the first air flow and a frequency of an activation of the second air flow are adjusted.

12. The method according to claim 4, characterized in that the first and the second air flow are directed in such a manner that they extend parallel with each other or intersect.

13. The method according to claim 4, characterized in that the first air flow is supplied in at least a first part flow in the lower region of the combustion chamber and in at least a second part flow in the upper region of the combustion chamber.

14. The method according to claim 4, characterized in that the first air flow is supplied in at least a first part flow in the lower region of the combustion chamber and in at least a second part flow in the upper region of the combustion chamber and the first part flow separates the supplied combustion material into dispersible and non-dispersible combustion material, the dispersible combustion material in the first part flow burning and being discharged from the combustion chamber, whilst the non-dispersible combustion material falls onto the floor and is lifted at that location by the second air flow and is brought into operational contact with the second part flow of the first air flow.

* * * * *